(12) United States Patent
Haraguchi et al.

(10) Patent No.: US 10,017,027 B2
(45) Date of Patent: Jul. 10, 2018

(54) VEHICULAR AIR CONDITIONER

(71) Applicant: DENSO CORPORATION, Kariya, Aichi-pref. (JP)

(72) Inventors: Akihiro Haraguchi, Chiryu (JP); Katsuji Kuwada, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 654 days.

(21) Appl. No.: 14/368,658

(22) PCT Filed: Nov. 15, 2012

(86) PCT No.: PCT/JP2012/007319
§ 371 (c)(1),
(2) Date: Jun. 25, 2014

(87) PCT Pub. No.: WO2013/099092
PCT Pub. Date: Jul. 4, 2013

(65) Prior Publication Data
US 2015/0107815 A1 Apr. 23, 2015

(30) Foreign Application Priority Data

Dec. 27, 2011 (JP) ................. 2011-286444

(51) Int. Cl.
*B60H 1/00* (2006.01)
(52) U.S. Cl.
CPC ..... *B60H 1/00028* (2013.01); *B60H 1/00064* (2013.01); *B60H 2001/00135* (2013.01)
(58) Field of Classification Search
CPC ........... B60H 2001/00092; B60H 2001/00135; B60H 1/00692; B60H 2001/00714
(Continued)

(56) References Cited

U.S. PATENT DOCUMENTS 6,311,763 B1 * 11/2001 Uemura ............. B60H 1/00664
165/43
6,508,703 B1 * 1/2003 Uemura ............. B60H 1/00692
251/901
(Continued)

FOREIGN PATENT DOCUMENTS

JP H09240247 A 9/1997
JP 2001010327 A 1/2001
(Continued)

OTHER PUBLICATIONS

Office Action dated Aug. 5, 2015 in corresponding CN Application No. 201280065056.4 with English translation.
(Continued)

*Primary Examiner* — Devon Russell
(74) *Attorney, Agent, or Firm* — Harness, Dickey & Pierce, P.L.C.

(57) ABSTRACT

A vehicular air conditioner includes a partitioning portion which separates an inside of an air-conditioning casing into an inside-air passage through which an inside air flows and an outside-air passage through which an outside air flows, a cooling heat exchanger extending across both the inside-air passage and the outside-air passage, a heating heat exchanger heating the inside air and the outside air on a downstream side of the cooling heat exchanger in an air flow, and a restriction portion provided downstream of the cooing heat exchanger in the air flow and limiting inflow of the inside air into the outside-air passage on the way to the heating heat exchanger. The restriction portion is located in the inside-air passage between the cooing heat exchanger and the heating heat exchanger, and includes a first temperature regulation door that regulates a temperature of air supplied to the vehicle compartment.

11 Claims, 6 Drawing Sheets

(58) Field of Classification Search
USPC .......................................................... 165/41
See application file for complete search history.

(56) References Cited

U.S. PATENT DOCUMENTS

| | | | | |
|---|---|---|---|---|
| 7,794,314 | B2* | 9/2010 | Sekiya | B60H 1/00692 |
| | | | | 165/41 |
| 8,757,245 | B2* | 6/2014 | Richter | B60H 1/00028 |
| | | | | 165/139 |
| 9,221,318 | B2* | 12/2015 | Uemura | B60H 1/00849 |
| 2004/0194947 | A1* | 10/2004 | Ito | B60H 1/00028 |
| | | | | 165/203 |
| 2010/0167635 | A1* | 7/2010 | Gotoh | B60H 1/00064 |
| | | | | 454/121 |

FOREIGN PATENT DOCUMENTS

| | | | |
|---|---|---|---|
| JP | 2001080339 A | 3/2001 | |
| JP | 2004175296 A | 6/2004 | |

OTHER PUBLICATIONS

Office Action dated Jan. 28, 2014 in the corresponding JP application No. 2011-286444 (Japanese with English Translation).
International Search Report and Written Opinion (in Japanese with English Translation) for PCT/JP2012/007319, dated Feb. 19, 2013; ISA/JP.

* cited by examiner

VEHICULAR AIR CONDITIONER

CROSS REFERENCE TO RELATED APPLICATION APPLICATIONS

This application is a U.S. National Phase Application under 35 U.S.C. 371 of International Application No. PCT/JP2012/007319 filed on Nov. 15, 2012 and published in Japanese as WO 2013/099092 A1 on Jul. 4, 2013. This application is based on Japanese Patent Application No. 2011-286444 filed on Dec. 27, 2011. The disclosures of all of the above applications are incorporated herein by reference.

TECHNICAL FIELD

The present disclosure relates to a vehicular air conditioner that includes an inside-air passage through which an inside air flows, and an outside-air passage through which an outside air flows.

BACKGROUND ART

A conventional technology described in Patent Document 1 relates to a vehicular air conditioner that includes a first air passage through which an air blown by a first fan flows, and a second air passage through which an air blown by a second fan flows. The first air passage and the second air passage are used as separated passages partitioned by a partitioning plate inside an air-conditioning casing. The conventional device includes an evaporator extending across both the first air passage and the second air passage, a heater core extending into both the first air passage and the second air passage at a downstream side of the evaporator, and air mix doors disposed in each of the first air passage and the second air passage between the evaporator and the heater core. In the conventional device, when an inside-outside air switching door is switched to be located at a predetermined position, and when the outside air is drawn by the first fan and the inside air is drawn by the second fan, the outside air flows through the first air passage and the inside air flows through the second air passage.

PRIOR ART DOCUMENT

Patent Document

Patent Document 1: JP-A-9-240247

SUMMARY OF THE INVENTION

According to study by the inventors of the present application, in the above-described configuration, the inside air which has passed through the evaporator in the second air passage may flow into the first air passage when passing through the heater core. This is because it is difficult actually to completely close a clearance between the partitioning plate and an air inlet surface of the heater core, while the first air passage and the second air passage are separated by the partitioning plate between the air inlet surface of the heater core and an air outlet surface of the evaporator. Also, when the inside air flows toward the first air passage, a possibility of inflow of the inside air into the outside air becomes high. Therefore, the inside air higher in humidity than the outside air may be mixed with the outside air and may be blown into a compartment, and a window may be fogged in the compartment.

The present disclosure is provided in consideration of the above-described points, and it is an objective of the present disclosure to provide a vehicular air conditioner capable of limiting inflow of air from an inside-air passage to an outside-air passage in a casing.

According to an example of the present disclosure, a vehicular air conditioner includes an air-conditioning casing, a blower drawing air into the air-conditioning casing, a partitioning portion separating an inside of the air-conditioning casing into an inside-air passage in which an inside air drawn by the blower from inside a vehicle compartment flows and an outside-air passage in which an outside air drawn by the blower from outside the vehicle compartment flows, a cooling heat exchanger extending across both the inside-air passage and the outside-air passage to cool the inside air and the outside air, a heating heat exchanger extending into both the inside-air passage and the outside-air passage on a downstream side of the cooling heat exchanger in an air flow direction to heat the inside air and the outside air, and a restriction portion provided downstream of the cooling heat exchanger in the air flow direction and limiting inflow of the inside air into the outside-air passage on the way to the heating heat exchanger. The restriction portion includes a first temperature regulation door disposed in the inside-air passage between the cooling heat exchanger and the heating heat exchanger. The first temperature regulation door separates the inside air flowing in the inside-air passage into an air passing through the heating heat exchanger and an air bypassing the heating heat exchanger, and regulates a temperature of air supplied to the vehicle compartment. The first temperature regulation door may include a first door end portion and a second door end portion that is farther from the partitioning portion than the first door end portion. A distance between the first door end portion and an air outlet surface of the cooling heat exchanger, through which air passing through the cooling heat exchanger flows out, may be shorter than a distance between the second door end portion and the air outlet surface.

In other words, in the first temperature regulation door disposed in the inside-air passage, the second door end portion which is farther from the partitioning portion than the first door end portion may be farther from the air outlet surface of the cooling heat exchanger than the first door end portion. Accordingly, both the air flowing through the heating heat exchanger and the air bypassing the heating heat exchanger can be made to flow in a direction away from the partitioning portion. By making such flows, a flow far from the partitioning portion rather than a flow near to the partitioning portion can be made to be main-stream in the inside-air passage when air that has passed through the cooing heat exchanger flows into an air inlet surface of the heating heat exchanger. In other words, a flow rate of the flow far from the partitioning portion can be made to be higher than a flow rate of the flow near to the partitioning portion. Hence, a pressure from the inside-air passage toward the outside-air passage can be reduced. Therefore, the vehicular air conditioner capable of limiting inflow of the inside air from the inside-air passage into the outside-air passage can be obtained.

The first temperature regulation door may be a sliding door that is displaced to move parallel. The restriction portion may further include a sealing portion that extends from the partitioning portion toward the sliding door and blocks an air to flow through the heating heat exchanger by overlapping with a part of the sliding door in the air flow direction. The sealing portion may extend in a direction away from both the partitioning portion and the air outlet surface of the cooling heat exchanger.

According to this, the inside air, which has passed through the cooling heat exchanger and flows along the partitioning portion in the inside-air passage, is changed to flow away from the partitioning portion by the sealing portion tilting with respect to the air outlet surface, and then the inside air flows into the air inlet surface of the heating heat exchanger. Therefore, further contribution to the reduction of the pressure from the inside-air passage toward the outside-air passage can be made.

The restriction portion may further include a second temperature regulation door disposed in the outside-air passage between the cooling heat exchanger and the heating heat exchanger. The second temperature regulation door separates the outside air flowing in the outside-air passage into an air passing through the heating heat exchanger and an air bypassing the heating heat exchanger, and regulates a temperature of air supplied to the vehicle compartment. The second temperature regulation door may include a first door end portion and a second door end portion that is nearer to the partitioning portion than the first door end portion. A distance between the first door end portion and the air outlet surface of the cooing heat exchanger may be shorter than a distance between the second door end portion and the air outlet surface.

According to this, in the second temperature regulation door disposed in the outside-air passage, the second door end portion, which is nearer to the partitioning portion than the first door end portion, is farther from the air outlet surface of the cooling heat exchanger than the first door end portion. An air to pass through the heating heat exchanger can be made to flow in a direction toward the partitioning portion. By making such flows, a flow rate of a flow near to the partitioning portion becomes higher than a flow rate of a flow far from the partitioning portion in the outside-air passage when air that has passed through the cooling heat exchanger flows into the air inlet surface of the heating heat exchanger. Accordingly, since the pressure from the outside-air passage toward the inside-air passage can be increased, a flow pushing back the inside air flowing from the inside-air passage to the outside-air passage can be made. Therefore, the effect to restrict inflow of the inside air from the inside-air passage into the outside-air passage can be improved.

The heating heat exchanger may include a first end portion located in the outside-air passage, and a second end portion located in the inside-air passage. A distance between the first end portion and the air outlet surface of the cooling heat exchanger may be shorter than a distance between the second end portion and the air outlet surface.

According to this, in the inside-air passage, a part of the air inlet surface, which is far from the partitioning portion, is located downstream of a part of the air inlet surface, which is near to the partitioning portion. Accordingly, when an air that has passed through the cooling heat exchanger flows into the air inlet surface of the heating heat exchanger, a passage in a part of the hating heat exchanger, which is far from the partitioning portion, is lower in pressure loss than a passage in a part of the heating heat exchanger, which is near to the partitioning portion. Hence, in the proximity of the air inlet surface, a flow rate of a flow far from the partitioning portion is larger than a flow rate of a flow near to the partitioning portion. Thus, the pressure from the inside-air passage toward the outside-air passage can be further reduced. Therefore, the effect to restrict the inflow of the inside air from the inside-air passage into the outside-air passage can be further improved.

EMBODIMENTS FOR EXPLOITATION OF THE INVENTION

Figure 1:
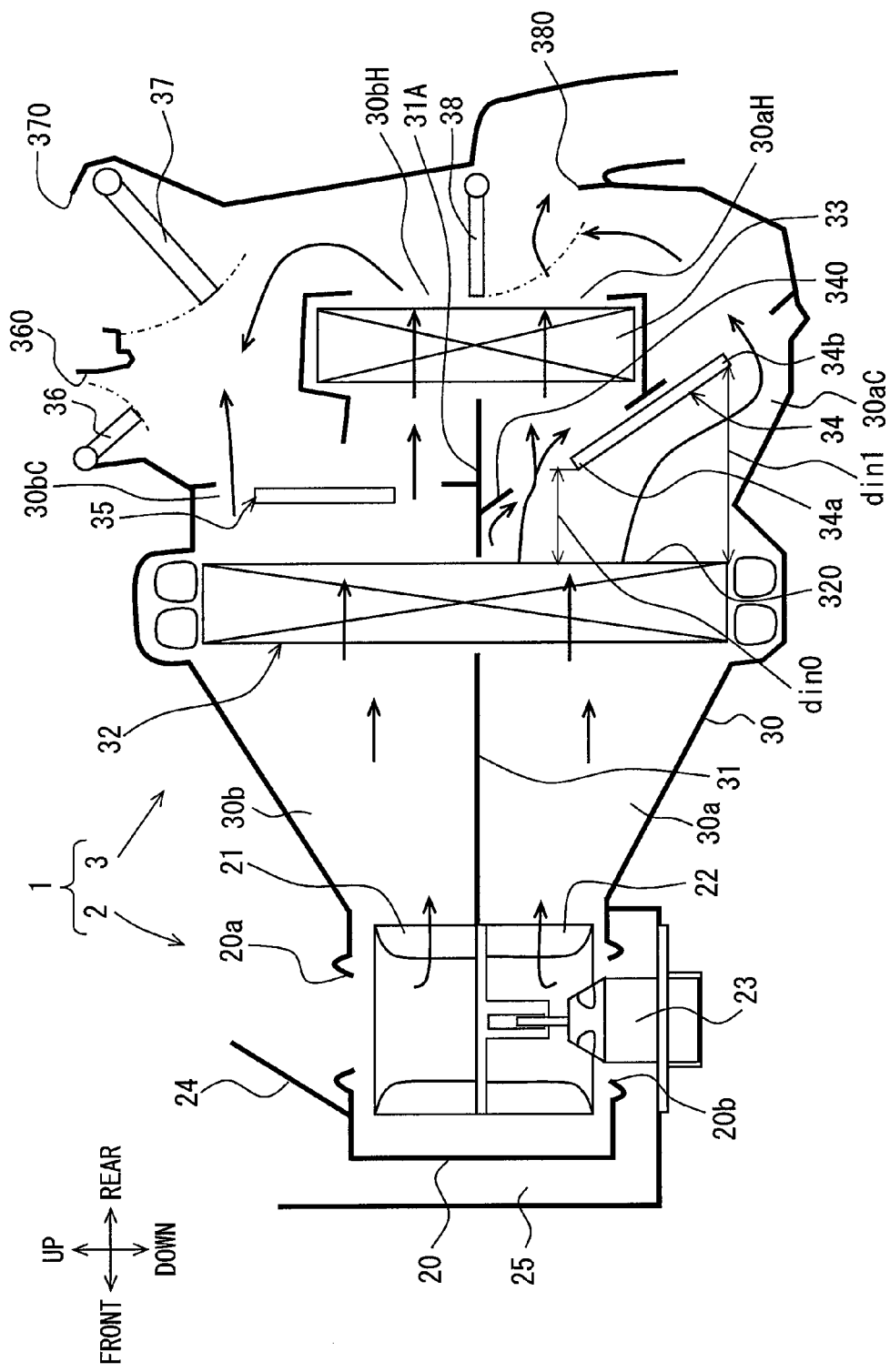
FIG. 1 is a schematic diagram showing a vehicular air conditioner according to a first embodiment of the present disclosure.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 2:
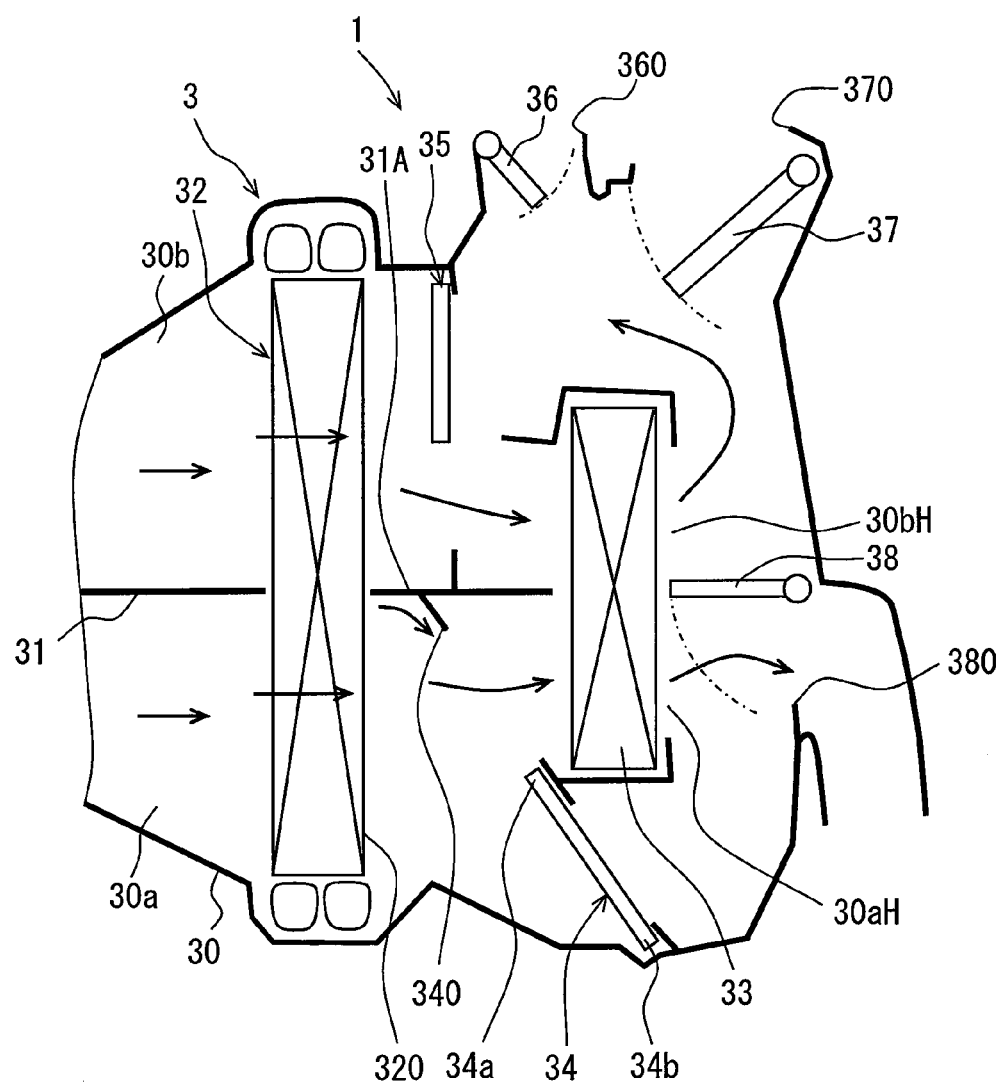
FIG. 2 is a schematic diagram showing a position of an air mix door in a maximum heating operation of the vehicular air conditioner according to the first embodiment.
Figure 3:
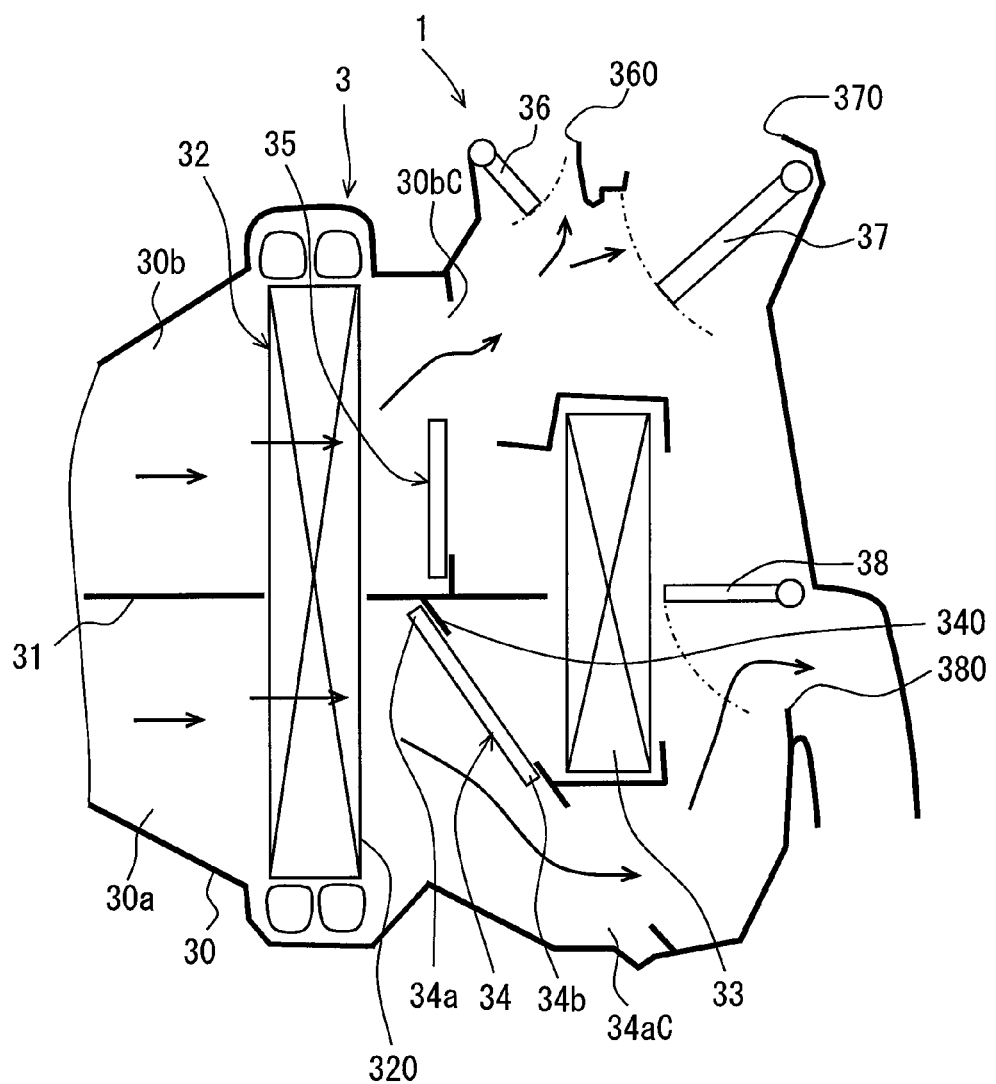
FIG. 3 is a schematic diagram showing a position of the air mix door in a maximum cooling operation of the vehicular air conditioner according to the first embodiment.

A vehicular air conditioner 1 of a first embodiment of the present disclosure will be described according to FIGS. 1 to 3. FIG. 1 is a schematic diagram showing an inner structure of the vehicular air conditioner 1 according to the first embodiment. In FIG. 1, a state where respective air mix doors 34 and 35 are provided is shown. FIG. 2 is a schematic diagram showing positions of the air mix doors 34 and 35 in a max hot operation of the vehicular air conditioner 1, in which a heating capacity of the vehicular air conditioner 1 is largest. FIG. 3 is a schematic diagram showing positions of the air mix doors 34 and 35 in a max cool operation of the vehicular air conditioner 1, in which a cooling capacity of the vehicular air conditioner 1 is largest.

The vehicular air conditioner 1 includes a blower unit 2 and an air-conditioning unit 3 that regulates a temperature of air blown from the blower unit 2. Each of the blower unit 2 and the air-conditioning unit 3 includes a resin-molded casing made, for example, of polypropylene, and this casing is formed by combining multiple separated casing members. The multiple separated casing members are coupled by using an elastic clip or a screw, for example. For further enhancement in its strength, a polypropylene resin containing a predetermined amount of talk or glass fiber may be used. For example, the blower unit 2 is disposed on a front-passenger's-seat side of a center position within an inner space of an instrumental panel located in a vehicle compartment. On the other hand, the air-conditioning unit 3 is disposed on an approximately center position of a vehicular width within the inner space of the instrumental panel.

The blower unit 2 includes an inside-outside air switching device that draws therein at least one of inside air and outside air. The inside air is air inside the vehicle compartment, and the outside air is air outside the vehicle compartment. The blower unit 2 includes a blower draws the inside air and the outside air. The inside-outside air switching device includes an inside-outside switching door 24, and open-closed states of an outside-air introduction port 20a and an inside-air introduction passage 25 are determined by a position of the inside-outside switching door 24. The blower draws the outside air, the inside air, or the both.

The blower includes two fans 21 and 22 which are centrifugal multi-blade fans, and the fans 21 and 22 are disposed coaxially with each other in an up-down direction with respect to a single rotational axis in a scroll casing 20 having a spiral shape. The fans 21 and 22 are driven to be rotated simultaneously by a motor 23. The scroll casing 20 includes an upper surface having the outside-air introduction port 20a that is a suction portion of the fan 21, and a lower surface having a suction port 20b that is a suction portion of the fan 22. The suction port 20b is connected to the inside-air introduction passage 25 positioned outside the scroll casing 20. Since the upper surface and the lower surface of the scroll casing 20 are approximately parallel to a ground surface in an in-vehicle state, the outside-air introduction port 20a and the suction port 20b are open parallel or approximately parallel to the ground surface similarly.

An air to be blown by the fan 21 located upper is drawn into the scroll casing 20 from top down through the outside-air introduction port 20a, and the air is blown out in a direction of an arrow shown in FIG. 1 along the spiral shape of the scroll casing 20 so as to be sent to the outside-air passage 30b. An air to be blown by the fan 22 located lower is drawn into the scroll casing 20 from bottom up through the suction port 20b, and the air is blown out in a direction of an arrow shown in FIG. 1 along the spiral shape of the scroll casing 20 so as to be sent to the inside-air passage 30a.

An inside of a duct that is a part of the air-conditioning casing 30 connected to the scroll casing 20 is partitioned into the inside-air passage 30a and the outside-air passage 30b. A partitioning portion 31 is a partition plate that separates an inside of the air-conditioning casing 30 into the inside-air passage 30a and the outside-air passage 30b between an evaporator 32 and the blower. The partitioning portion 31 is formed integrally with an inner wall surface of the air-conditioning casing 30.

The air-conditioning unit 3 accommodates, for example, the evaporator 32, a heater core 33, the two air mix doors 34 and 35 inside the air-conditioning casing 30. The evaporator 32 is thinned in a vehicular front-back direction and is disposed to extend across the inside-air passage 30a and the outside-air passage 30b in the air-conditioning casing 30. Thus, a blown air from the blower unit 2 flows into a front surface of the evaporator 32, which extends in a vehicular up-down direction and in a vehicular right-left direction. The evaporator 32 is used as an example of a cooling heat exchanger that cools the inside air and the outside air which flow, respectively, through the inside-air passage 30a and the outside-air passage 30b. In the cooling heat exchanger, refrigerant of a refrigeration cycle absorbs heat for its latent heat of evaporation from air passing through the cooling heat exchanger.

The heater core 33 is disposed across a predetermined distance from the evaporator 32 on a downstream side of the evaporator 32 in an air flow direction, i.e. on a vehicular-rear side of the evaporator 32. The heater core 33 is used as an example of a heating heat exchanger that heats air that has passed through the evaporator 32. The heating heat exchanger has a configuration in which a high-temperature fluid (e.g., engine coolant) flows, and the heating heat exchanger heats air by using the hot coolant as a heat source.

A space between the evaporator 32 and the heater core 33 inside the air-conditioning casing 30 is partitioned into upper and lower passages by a partitioning portion 31A. The upper and lower passages communicate with the inside-air passage 30a and the outside-air passage 30b, respectively, through the evaporator 32. That is, the upper and lower passages are an inside-air passage through which the inside air flows and an outside-air passage through which the outside air flows. The partitioning portion 31A is a partition plate that separates an inside of the air-conditioning casing 30 into the inside-air passage and the outside-air passage between the evaporator 32 and the heater core 33. The partitioning portion 31A is formed integrally with the inner wall surface of the air-conditioning casing 30.

The heater core 33 is disposed such that its heat exchange portion extends across both upper and lower sides of the partitioning portion 31A, and extends into (i.e. cross over partially) both the inside-air passage and the outside-air passage. Hence, the inside air flowing near the partitioning portion 31A in the inside-air passage and the outside air flowing near the partitioning portion 31A in the outside-air passage pass through the heat exchange portion of the heater core 33 while the inside air flowing in a lower part of the inside-air passage and the outside air flowing in an upper part of the outside-air passage flow without passing through the heat exchange portion of the heater core 33.

The air mix door 34 is provided in the inside-air passage between the evaporator 32 and the heater core 33. The air mix door 34 is a first temperature regulation door that separates air that has passed through the evaporator 32 into an air heated in the heater core 33 and an air that bypasses the heater core 33 so as not to be heated. The first temperature regulation door regulates a ratio of flow rates of the two airs. Therefore, the air mix door 34 is an air-mixing temperature regulation device that separates a vehicular interior air, which has been cooled in the evaporator 32, into a cold air and a hot air and adjusts a mixing ratio of the cold air and the hot air, thereby generating a conditioned air to be supplied into the vehicle compartment. The vehicular interior air adjusted in temperature flows through a foot air outlet 380 and a duct, and the vehicular interior air is blown out into the vehicle compartment through an air blowing port that is open in the vehicle compartment.

The air mix door 34 is a plate-shaped sliding door that is displaced to move parallel. The air mix door 34 includes one door end portion 34a (first door end portion), and the other door end portion 34b (second door end portion) that is farther from the partitioning portion 31A than the one door end portion 34a. As shown in FIG. 1, a distance din0 between an air outlet surface 320 of the evaporator 32 (i.e. a rear surface of a heat exchange portion of the evaporator 32), from which air passing through the evaporator 32 flows out, and the one door end portion 34a is shorter than a distance din1 between the air outlet surface 320 and the other door end portion 34b.

In other words, when the air outlet surface 320 is defined as a reference surface, the air mix door 34 is disposed such that the one door end portion 34a located in an upper end part becomes nearer to the reference surface than the other door end portion 34*b* located in a lower end part. The air mix door 34 is disposed such that its part on a side of the partitioning portion 31A is tilted toward the air outlet surface 320. According to this configuration, an upper part of the air mix door 34, near to the partitioning portion 31A, is always nearer to the air outlet surface 320 than a lower part of the air mix door 34 in an entire movable range of the air mix door 34. The air mix door 34 may be used as an example of a restriction portion that is provided downstream of the evaporator 32 in the air flow direction and restricts inflow of the inside air, which flows toward or through the heater core 33, into the outside-air passage 30*b*.

A sealing portion 340 is provided to the partitioning portion 31A and extends from the partitioning portion 31A toward the air mix door 34. The sealing portion 340 extends in a direction away from both the partitioning portion 31A and the air outlet surface 320. In other words, the sealing portion 340 is tilted with respect to the air outlet surface 320. A tilt angle of the sealing portion 340 is set to be the same as a tilt angle of the air mix door 34 with respect to the air outlet surface 320. The sealing portion 340 overlaps with the one door end portion 34*a* in the air flow direction when the air mix door 34 is located at an uppermost position near to the partitioning portion 31A. Accordingly, an air flow is prevented from passing through the heater core 33. The sealing portion 340 may be used as an example of the above-described restriction portion.

The air mix door 35 is provided in the outside-air passage between the evaporator 32 and the heater core 33. The air mix door 35 is a second temperature regulation door that separates air which has passed through the evaporator 32 into an air heated in the heater core 33 and an air that bypasses the heater core 33 so as not to be heated. The second temperature regulation door regulates a ratio of flow rates of the two airs. Therefore, the air mix door 35 is an air-mixing temperature regulation device that separates a vehicular exterior air, which has been cooled in the evaporator 32, into a cold air and a hot air and adjusts a mixing ratio of the cold air and the hot air, thereby generating a conditioned air to be supplied into the vehicle compartment. The vehicular exterior air adjusted in temperature flows through a defroster air outlet 360 or a face air outlet 370 and through a duct, and the vehicular exterior air is blown out into the vehicle compartment through an air blowing port that is open in the vehicle compartment.

As shown in FIG. 1, when the air mix door 34 is controlled and located at a middle position in the inside-air passage, a passage through which air flows toward the heater core 33 is formed above the one door end portion 34*a*, i.e. on a side of the one door end portion 34*a* toward the partitioning portion 31A. This passage communicates with a hot-air passage 30*a*H, which is an outlet of the heater core 33, through the heater core 33. Additionally, a cold-air passage 30*a*C, which communicates with an area under the heater core 33, is formed below the other door end portion 34*b*. When the air mix door 35 is controlled and located at a middle position in the onside-air passage, a passage through which air flows toward the heater core 33 is formed below a lower end part of the air mix door 35. This passage communicates with a hot-air passage 30*b*H, which is the outlet of the heater core 33, through the heater core 33. Additionally, a cold-air passage 30*b*C, which communicates with an area above the heater core 33, is formed over an upper end part of the air mix door 35.

As described above, each air mix door 34, 35 adjusts a ratio between a flow rate of the hot air that passes through the heater core 33 and a flow rate of the cold air that does not pass through the heater core 33 in accordance with a position of each air mix door 34, 35. Each air mix door 34, 35 regulates a temperature of the conditioned air by adjusting the flow rate ratio between the cold air and the hot air depending on the position (open degree) of each air mix door 34, 35. A controller controls the position of each air mix door 34, 35 depending on a command in manual operation or a set temperature in automatic air conditioning.

An air mix chamber is provided on a downstream side of the heater core 33 in each of the inside-air passage and the outside-air passage in an interior space of the air-conditioning casing 30. The air mix chamber is a space where the cold air flowing from the evaporator 32 and the hot air heated in the heater core 33 are mixed. The air mix chamber of the inside-air passage communicates with the hot-air passage 30*a*H and the cold-air passage 30*a*C, and the air mix chamber of the outside-air passage communicates with the hot-air passage 30*b*H and the cold-air passage 30*b*C. The conditioned airs that have been regulated in temperature in the respective air mix chambers are supplied to the vehicle compartment at an appropriate flow-rate ratio by controlling doors 36, 37 and 38 which open or close, respectively, the air outlets 360, 370 and 380 communicating with the vehicle compartment.

The defroster air outlet 360 opened or closed by the defroster door 36 and the face air outlet 370 opened or closed by the face door 37 are provided in an upper part of the air-conditioning casing 30 on its vehicular rear side, and both of the air outlets 360 and 370 communicate with the outside-air passage. The foot air outlet 380 opened or closed by the foot door 38 is provided in a lower part of the air-conditioning casing 30 on its vehicular rear side, and the air outlet 380 communicates with the inside-air passage. The defroster air outlet 360 communicates through a duct with an air blowing port that is located in the vehicle compartment and opens toward a window glass. The face air outlet 370 communicates through a duct with an air blowing port that is located in the vehicle compartment and opens toward an upper part of a passenger. The foot air outlet 380 communicates through a duct with an air blowing port that is located in the vehicle compartment and opens toward a foot area of the passenger. When the foot air outlet 380 is open, the foot door 38 is controlled and located to separate the outside-air passage and the inside-air passage. Thus, the foot door 38 functions as a partitioning portion.

The non-shown controller controls an air suction mode of the inside-outside air switching device depending on a command in manual operation or a set temperature in automatic air conditioning. The controller selects an outside-air mode, an inside-air mode or an inside-outside air bilayer mode as the air suction mode. The controller controls an air blowing amount from the blower, and temperature regulation of air by the air mix doors 34 and 35, depending on a command in the manual operation or a set temperature in the automatic air conditioning. In the temperature regulation, the air mix doors 34 and 35 regulate a temperature of air blown into the vehicle compartment. While controlling the air suction mode, the controller controls movements of the doors 36, 37 and 38 which open or close, respectively, the air outlets 360, 370 and 380, depending on a command in the manual operation or a set temperature in the automatic air conditioning.

In the inside-outside air bilayer mode in which the inside air and the outside air are separately drawn into the air-conditioning casing 30, the outside air and the inside air are separately conditioned and blown into the vehicle compartment from a predetermined position. In an example of the inside-outside air bilayer mode, as shown in FIG. 1, the inside air drawn through the inside-air introduction passage 25 is made to flow through the inside-air passage 30a and pass through the evaporator 32 by the fan 22. After being cooled in the evaporator 32, the inside air is separated into an air flowing toward the hot-air passage 30aH and an air flowing toward the cold-air passage 30aC and is adjusted in their flow rates, by the air mix door 34.

An air flowing near the partitioning portion 31A from the air outlet surface 320 of the evaporator 32 toward the hot-air passage 30aH is changed to flow in a direction away from the partitioning portion 31A by the sealing portion 340. Then, the air passes through a passage between the one door end portion 34a of the air mix door 34 and the sealing portion 340, and flows into the air inlet surface of the heater core 33. The air flowing in the passage between the one door end portion 34a of the air mix door 34 and the sealing portion 340 spreads downward so as to flow away from the partitioning portion 31A, and flows into the air inlet surface of the heater core 33.

Since such flow is generated, the inside air in the inside-air passage 30a can be prevented from entering the outside-air passage 30b through a clearance or the like formed between the air inlet surface of the heater core 33 and the partitioning portion 31A. The inside air is higher in humidity than the outside air. The air is heated in the heat exchange portion of the heater core 33 and flows out of the air outlet surface. Then, the air reaches the air mix chamber through the hot-air passage 30aH.

An air flowing from the air outlet surface 320 of the evaporator 32 toward the cold-air passage 30aC flows downward along a surface (tilted surface) of the air mix door 34. The air is changed in flow direction to flow upward in the cold-air passage 30aC without passing through the heater core 33, and reaches the air mix chamber located vehicular-rearward of the heater core 33. In the air mix chamber, the hot air from the hot-air passage 30aH and the cold air from the cold-air passage 30aC mix with each other to be temperature-adjusted conditioned air. The conditioned air is blown into the duct through the foot air outlet 380 and is blown from the air blowing port in the vehicle compartment toward the foot area of the passenger.

On the other hand, the outside air drawn from the outside air introduction port 20a is made to flow in the outside-air passage 30b and pass through the evaporator 32 by the fan 21. After passing through the evaporator 32, the outside air is separated into an air flowing toward the hot-air passage 30bH and an air flowing toward the cold-air passage 30bC and is adjusted in flow rate by the air mix door 35.

The air flowing toward the hot-air passage 30bH flows through a passage between the lower end part of the air mix door 35 and the partitioning portion 31A, and flows into the air inlet surface of the heater core 33. The air is heated in the heat exchange portion of the heater core 33 and flows out of the air outlet surface. Then, the air reaches air mix chamber through the hot-air passage 30bH.

The air flowing toward the cold-air passage 30bC flows from the air outlet surface 320 of the evaporator 32 through between the upper end part of the air mix door 35 and the inner wall surface of the air-conditioning casing 30, and then reaches the air mix chamber without passing through the heater core 33. In the air mix chamber, the hot air from the hot-air passage 30bH and the cold air from the cold-air passage 30bC mix with each other to be conditioned air adjusted in temperature. The conditioned air is blown into the duct through the face air outlet 370 and is blown from the air blowing port in the vehicle compartment toward an upper part of a passenger. Also, the conditioned air is blown into the duct through the defroster air outlet 360 and is blown from the air blowing port in the vehicle compartment toward the window glass.

FIG. 2 is a schematic diagram showing positions of the air mix doors 34 and 35 in the max hot operation (maximum heating operation) of the vehicular air conditioner 1. As shown in FIG. 2, in the max hot operation and the inside-outside air bilayer mode, all inside air that has passed through the evaporator 32 flows through the heater core 33 to be heated because the air mix door 34 is located to close the cold-air passage 30aC. After the heating, the inside air flows into the hot-air passage 30aH. The air flowing from the air outlet surface 320 of the evaporator 32 near the partitioning portion 31A is changed by the sealing portion 340 to flow in a direction away from the partitioning portion 31A, and flows into the air inlet surface of the heater core 33. Since such flow is generated, the inside air having a humidity higher than that of the outside air and flowing in the inside-air passage 30a can be prevented from entering the outside-air passage 30b through a clearance or the like formed between the air inlet surface of the heater core 33 and the partitioning portion 31A. The conditioned air adjusted in temperature as above is blown into the duct through the foot air outlet 380 and is blown from the air blowing port in the vehicle compartment toward a foot area of a passenger.

On the other hand, all outside air that has passed through the evaporator 32 flows into the heater core 33 to be heated because the air mix door 35 is located to close the cold-air passage 30bC. After the heating, the outside air flows into the hot-air passage 30bH. The conditioned air adjusted in temperature as above is blown into the ducts through the defroster air outlet 360 and the face air outlet 370. The conditioned air is blown from the air blowing port in the vehicle compartment toward an upper part of a passenger and from the air blowing port in the vehicle compartment toward the window glass.

FIG. 3 is a schematic diagram showing positions of the air mix doors 34 and 35 in the max cool operation (maximum cooling operation) of the vehicular air conditioner 1. As shown in FIG. 3, in the max cool operation and the inside-outside air bilayer mode, all inside air that has passed through the evaporator 32 flows into the cold-air passage 30aC without passing through the heater core 33 because the air mix door 34 is located to close the hot-air passage 30aH. The conditioned air adjusted in temperature as above is blown into the duct through the foot air outlet 380 and is blown from the air blowing port in the vehicle compartment toward a foot area of a passenger.

On the other hand, all outside air that has passed through the evaporator 32 flows into the cold-air passage 30bC without passing through the heater core 33 because the air mix door 35 is located to close the hot-air passage 30bH. The conditioned air adjusted in temperature as above is blown into the ducts through the defroster air outlet 360 and the face air outlet 370. The conditioned air is blown from the air blowing port in the vehicle compartment toward an upper part of a passenger and from the air blowing port in the vehicle compartment toward the window glass.

Hereinafter, function effects obtained in the vehicular air conditioner 1 of the first embodiment will be described. In the vehicular air conditioner 1, the air mix door 34 includes the one door end portion 34a and the other door end portion 34b that is farther from the partitioning portion 31A than the one door end portion 34a. The distance din0 between the air outlet surface 320 of the evaporator 32, from which air passing through the evaporator 32 flows out, and the one door end portion 34a is shorter than the distance din1 between the air outlet surface 320 and the other door end portion 34b. That is, the air mix door 34 is disposed to be tilted with respect to the air outlet surface 320.

In other words, in the air mix door 34 disposed in the inside-air passage 30a, the other door end portion 34b, which is father from the partitioning portion 31A than the one door end portion 34a, is farther from the air outlet surface 320 of the evaporator 32 than the one door end portion 34a. Accordingly, both the air passing through the heater core 33 and the air bypassing the heater core 33 are made to flow in the direction away from the partitioning portion 31A. By making such flows, an air flow far from the partitioning portion 31A rather than an air flow near to the partitioning portion 31A becomes main-stream in the inside-air passage 30a when air that has passed through the evaporator 32 flows into the air inlet surface of the heater core 33. That is, a flow rate of the air flow far from the partitioning portion 31A becomes higher than a flow rate of the air flow near to the partitioning portion 31A. Thus, in the vicinity of the air inlet surface of the heater core 33, a pressure from the inside-air passage 30a toward the outside-air passage 30b can be made to be small. Therefore, the vehicular air conditioner 1 capable of restricting inflow of the inside air from the inside-air passage into the outside-air passage can be provided.

According to the first embodiment, the inside air recirculating and having high humidity is difficult to flow into the outside air in the outside-air passage 30b. Hence, effects to restrict frosting of a window can be improved, for example, in a defroster blowing mode or a foot blowing mode, in which air is blown to the window glass. Due to the restriction of the window frosting, it can be delayed that the window is frosted. Thus, the inside-outside air bilayer mode can be kept for a long time. When the inside-outside air bilayer mode is terminated, the outside-air introduction mode is selected generally. In this case, energy loss may occur in the introduction of the outside air. Therefore, by keeping the inside-outside air bilayer mode for a long time, the energy loss can be reduced, and reduction in room temperature can be limited. Thus, power for air conditioning can be reduced. Accordingly, a contribution to fuel saving of the vehicle also can be made.

Also, according to the first embodiment, the air mix door 34 is a sliding door that is displaced to move parallel. The vehicular air conditioner 1 includes the sealing portion 340 that extends from the partitioning portion 31A toward the air mix door 34 and blocks air to pass through the heater core 33 by overlapping with the end portion of the air mix door 34 in the air flow direction. The sealing portion 340 extends in a direction away from the partitioning portion 31A and the air outlet surface 320 and is tilted with respect to the air outlet surface 320.

According to this configuration, the inside air passing through the evaporator 32 and flowing along the partitioning portion 31A in the inside-air passage is changed to flow in a direction away from the partitioning portion 31A by the sealing portion 340 tilted with respect to the air outlet surface 320, and then the inside air flows into the air inlet surface of the heater core 33. Hence, the pressure from the inside-air passage 30a toward the outside-air passage 30b can be further reduced.

Second Embodiment

Figure 4:
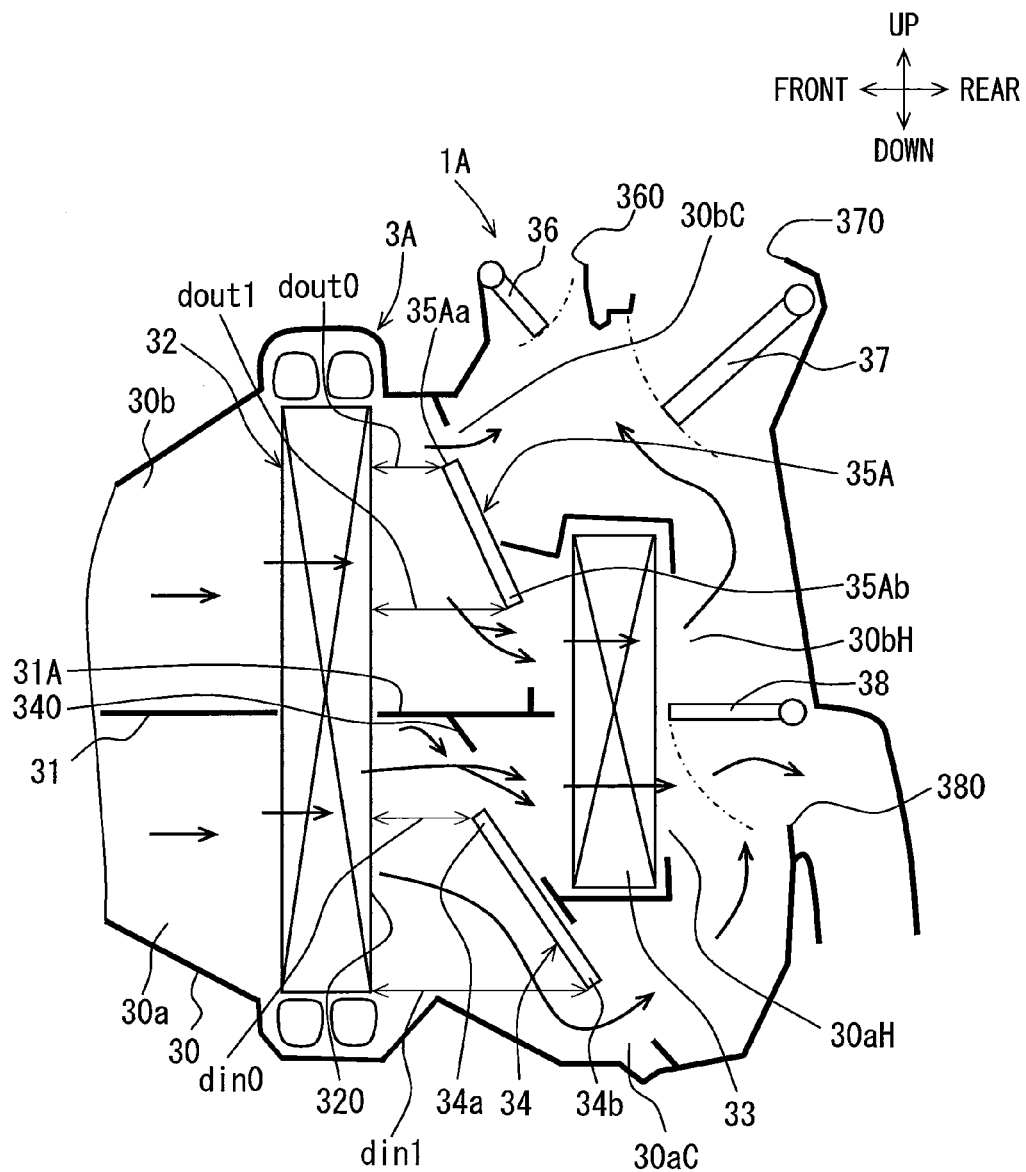
FIG. 4 is a schematic diagram showing a vehicular air conditioner according to a second embodiment of the present disclosure.

In a second embodiment, the configuration of the vehicular air conditioner of the first embodiment is changed. FIG. 4 is a schematic diagram showing an inner structure of a vehicular air conditioner 1A according to the second embodiment. Hereinafter, a configuration to which no explanation is provided is similar to that of the first embodiment, and a configuration different from the first embodiment will be explained.

In an air-conditioning unit 3A of the vehicular air conditioner 1A, a configuration of an air mix door 35A disposed in the outside-air passage is different from the first embodiment.

The air mix door 35A is a sliding door that is displaced to move parallel. The air mix door 35A includes one door end portion 35Aa and the other door end portion 35Ab that is nearer to a partitioning portion 31A than the one door end portion 35Aa. As shown in FIG. 4, a distance dout0 between an air outlet surface 320 of an evaporator 32, from which air passing through the evaporator 32 flows out, and the one door end portion 35Aa is shorter than a distance dout1 between the air outlet surface 320 and the other door end portion 35Ab.

In other words, an end part of the air mix door 35A, farther from the partitioning portion 31A, is tilted toward the air outlet surface 320. Hence, when the air outlet surface 320 is defined as a reference surface, the one door end portion 35Aa located in an upper end part of the air mix door 35A is nearer to the reference surface than the other door end portion 35Ab located in a lower end part of the air mix door 35A. According to this configuration, in an entire movable range of the air mix door 35A, an upper part of the air mix door 35A, which is farther from the partitioning portion 31A than a lower part of the air mix door 35A, is nearer to the air outlet surface 320 than the lower part. The air mix door 35A may be used as the above-described restriction portion.

Next, in the inside-outside air bilayer mode in which the inside air and the outside air are separately drawn into an air-conditioning casing 30, the outside air and the inside air are separately adjusted in temperature and are blown into a vehicle compartment from a predetermined position. In an example of the inside-outside air bilayer mode, as shown in FIG. 4, a flow of the inside air drawn into the air-conditioning casing 30 is similar to that of the first embodiment, and its explanation will be omitted.

On the other hand, the outside air drawn through an outside-air introduction port 20a is made to flow in an outside-air passage 30b and pass through the evaporator 32 by a fan 21. Then, the outside air is separated into an air flowing toward a hot-air passage 30bH and an air flowing toward a cold-air passage 30bC, and their flow rates are adjusted, by the air mix door 35A.

An air flowing toward the hot-air passage 30bH flows from the air outlet surface 320 of the evaporator 32 along a surface (tilted surface) of the air mix door 35A. Then, the air spreads downward so as to approach the partitioning portion 31A and flows into an air inlet surface of the heater core 33. Subsequently, a hot air heated in the heater core 33 is changed to flow upward in the hot-air passage 30bH and reaches an air mix chamber.

On the other hand, an air flowing toward the cold-air passage 30bC flows between the one door end portion 35Aa (an upper end part of the air mix door 35A) and an inner wall surface of the air-conditioning casing 30, and the air reaches the air mix chamber without passing through the heater core 33. In the air mix chamber, the hot air from the hot-air passage 30bH and the cold air from the cold-air passage 30bC mix with each other to be a conditioned air regulated in temperature. The conditioned air is blown into a duct through a face air outlet 370 and blown from an air blowing port in the vehicle compartment toward an upper part of a passenger. The conditioned air is blown also into a duct through a defroster air outlet 360 and blown from an air blowing port in the vehicle compartment toward a window glass.

According to the vehicular air conditioner 1A of the second embodiment, in the air mix door 35A disposed in the outside-air passage, the other door end portion 35Ab, which is nearer to the partitioning portion 31A than the one door end portion 35Aa, is farther from the air outlet surface 320 of the evaporator 32 than the one door end portion 35Aa. Accordingly, an air flowing through the heater core 33 is made to flow in a direction toward the partitioning portion 31A. By making such flow, in the outside-air passage, a flow rate of an air near to the partitioning portion 31A can be made to be higher than a flow rate of an air far from the partitioning portion 31A when air that has passed through the evaporator 32 flows into the air inlet surface of the heater core 33. Because of the difference in flow rate, a pressure from the outside-air passage toward the inside-air passage can be increased. Hence, a flow pushing back the inside air that flows from the inside-air passage to the outside-air passage can be generated. Therefore, in the second embodiment, further restriction effects can be obtained in addition to the effects of the first embodiment to restrict inflow of the inside air.

Third Embodiment

Figure 5:
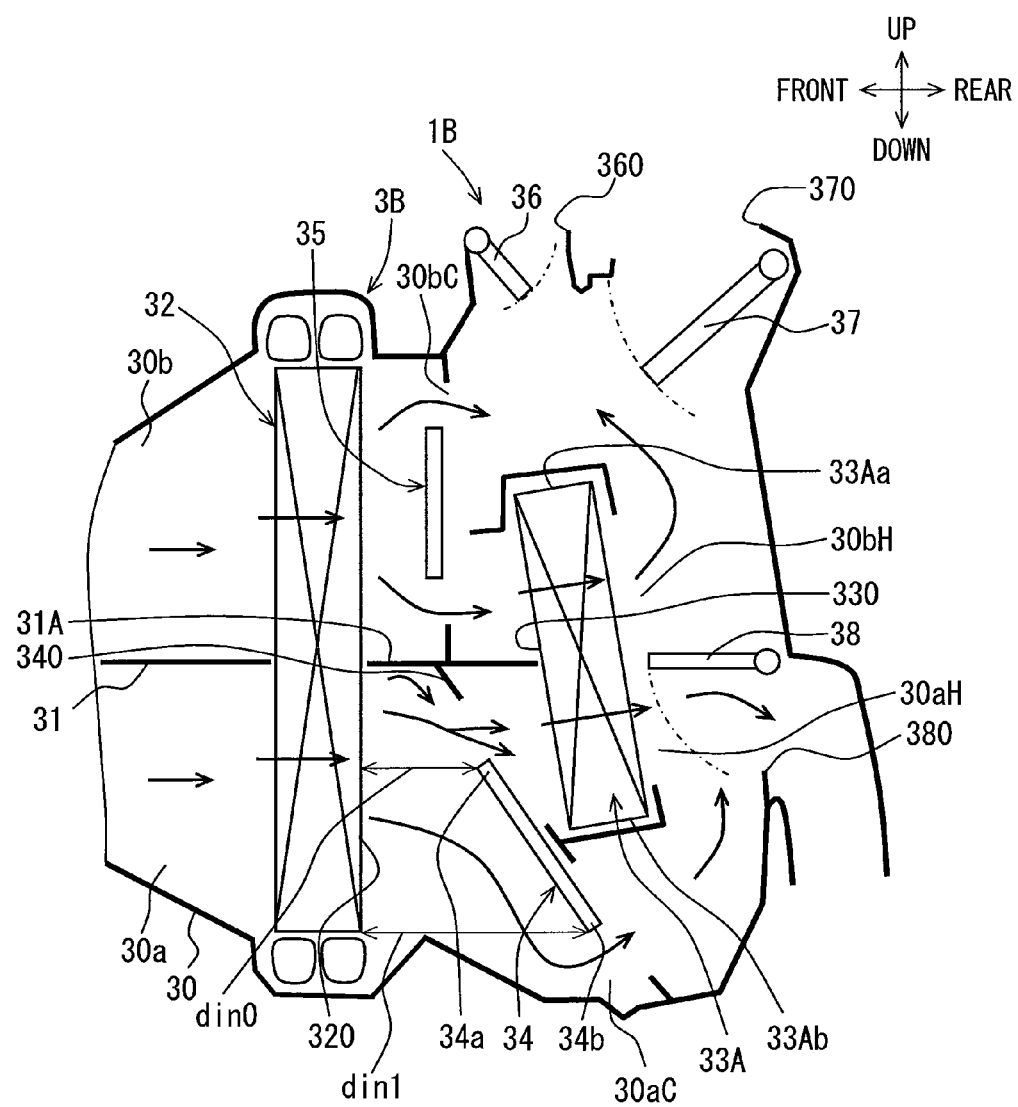
FIG. 5 is a schematic diagram showing a vehicular air conditioner according to a third embodiment of the present disclosure.

In a third embodiment, the configuration of the vehicular air conditioner of the first embodiment is changed. FIG. 5 is a schematic diagram showing an inner structure of a vehicular air conditioner 1B according to the third embodiment. Hereinafter, a configuration to which no explanation is provided is similar to that of the first embodiment, and a configuration different from the first embodiment will be explained.

In an air-conditioning unit 3B of the vehicular air conditioner 1B, a configuration of a heater core 33A is different from the first embodiment.

The heater core 33A includes one end portion 33Aa (first end portion) located in an outside-air passage, and the other end portion 33Ab (second end portion) located in the inside-air passage. A distance between an air outlet surface 320 of an evaporator 32 and the one end portion 33Aa is shorter than a distance between the air outlet surface 320 and the other end portion 33Ab. That is, the heater core 33A is tilted with respect to the air outlet surface 320. Thus, a heat exchange portion of the heater core 33A is not perpendicular to a partitioning portion 31A, and intersects with the partitioning portion 31A with tilting with respect to the partitioning portion 31A. The air inlet surface 330 of the heater core 33A is not parallel to the air outlet surface 320 of the evaporator 32, and is tilted so as to intersect.

According to the vehicular air conditioner 1B of the third embodiment, in the inside-air passage, a part of the air inlet surface 330, which is far from the partitioning portion 31A, is located downstream of a part of the air inlet surface 330, which is near to the partitioning portion 31A. Accordingly, when air that has passed through the evaporator 32 flows into the air inlet surface 330 of the heater core 33A, a passage of the heater core 33A in a position far from the partitioning portion 31A is lower in pressure loss than a passage of the heater core 33A in a position near to the partitioning portion 31A. Because of the difference in pressure loss, in the vicinity of the air inlet surface 330, a flow rate of air flowing far from the partitioning portion 31A becomes higher than a flow rate of air flowing near the partitioning portion 31A. Hence, effects to further reduce the pressure from the inside-air passage toward the outside-air passage can be obtained. Therefore, according to the third embodiment, further restriction effects can be obtained in addition to the effects of the first embodiment to restrict inflow of the inside air. The third embodiment can be applied to the device of the second embodiment. In this case, further restriction effects can be obtained in addition to the effects of the second embodiment to restrict inflow of the inside air.

Fourth Embodiment

Figure 6:
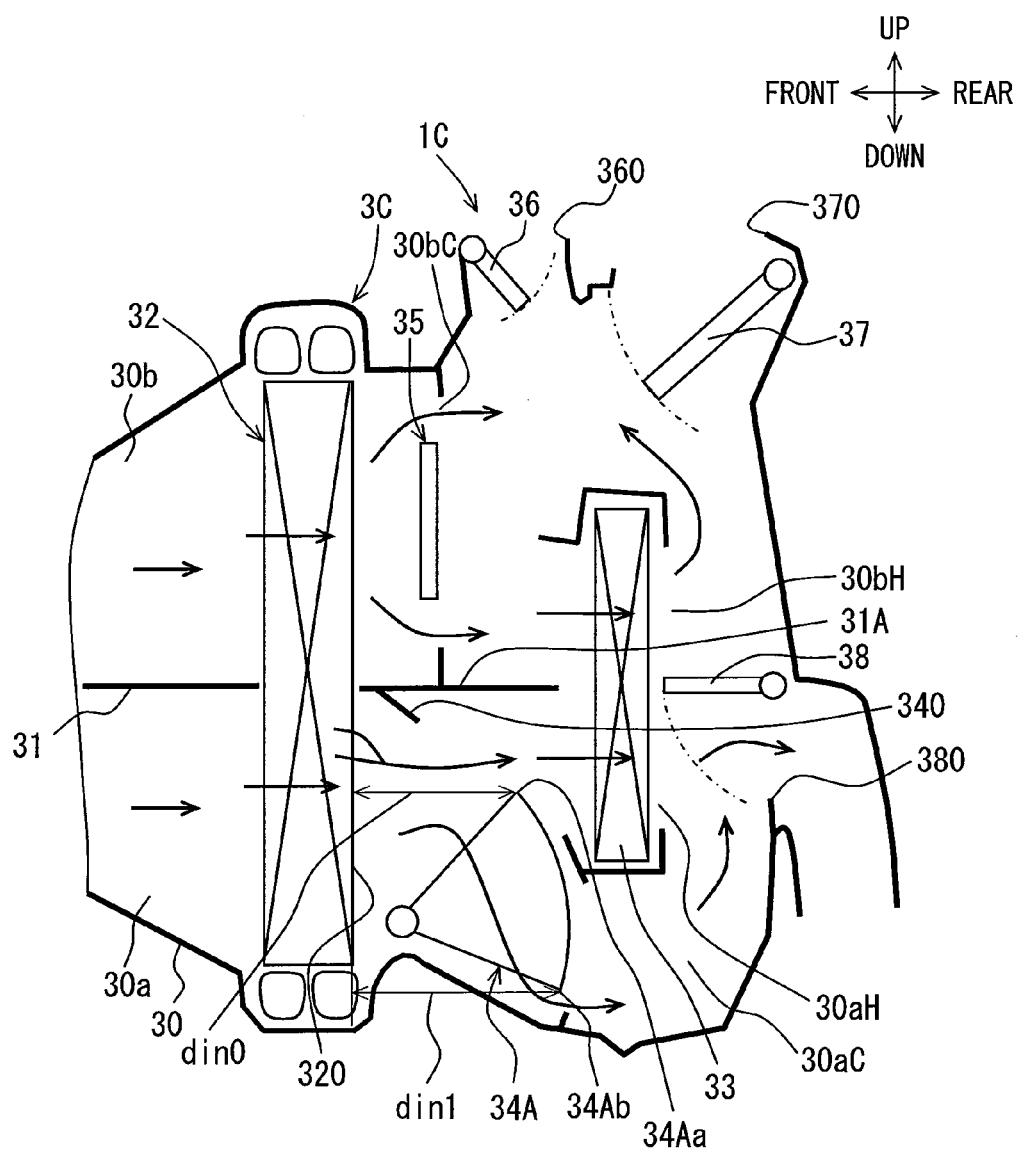
FIG. 6 is a schematic diagram showing a vehicular air conditioner according to a fourth embodiment of the present disclosure.

In a fourth embodiment, the configuration of the vehicular air conditioner of the first embodiment is changed. FIG. 6 is a schematic diagram showing an inner structure of a vehicular air conditioner 1C according to the fourth embodiment. Hereinafter, a configuration to which no explanation is provided is similar to that of the first embodiment, and a configuration different from the first embodiment will be explained.

In an air-conditioning unit 3C of the vehicular air conditioner 1C, a configuration of an air mix door 34A is different from the first embodiment.

As shown in FIG. 6, the air mix door 34A is a first temperature regulation door configured by a rotary door having an arc-shaped outer wall. The air mix door 34A includes one door end portion 34Aa (first door end portion), and the other door end portion 34Ab (second door end portion) that is farther from a partitioning portion 31A than the one door end portion 34Aa. As shown in FIG. 6, a distance din0 between an air outlet surface 320 of an evaporator 32 (i.e. a rear surface of a heat exchange portion of the evaporator 32), from which air that has passed through the evaporator 32 flows out, and the one door end portion 34Aa is shorter than a distance din1 between the air outlet surface 320 and the other door end portion 34Ab. The one door end portion 34Aa corresponds to one end of the arc-shaped outer wall, and the other door end portion 34Ab corresponds to the other end of the arc-shaped outer wall.

In other words, the air mix door 34A is disposed such that a part of the air mix door 34A on a side of the partitioning portion 31A is tilted toward the air outlet surface 320. When the air outlet surface 320 is defined as a reference surface, the one door end portion 34Aa located in au upper end part of the air mix door 34A is nearer to the reference surface than the other door end portion 34Ab located in a lower end part of the air mix door 34A. According to the configuration, in an entire movable range of the air mix door 34A, an upper part of the air mix door 34A, which is nearer to the partitioning portion 31A than a lower part of the air mix door 34A, is nearer to the air outlet surface 320 than the lower part.

Next, in the inside-outside air bilayer mode in which the inside air and the outside air are separately drawn into an air-conditioning casing 30, the outside air and the inside air are separately adjusted in temperature and blown into a vehicle compartment from a predetermined position. In an example of the inside-outside air bilayer mode, as shown in FIG. 6, a flow of the outside air drawn into the air-conditioning casing 30 is similar to that of the first embodiment, and the explanation will be omitted.

The inside air drawn into the air-conditioning casing 30 is made to flow in an inside-air passage 30a and pass through the evaporator 32 by a fan 22. Then, the inside air is separated into an air flowing toward a hot-air passage 30aH and an air flowing toward a cold-air passage 30aC and is adjusted in their flow rates, by the air mix door 34A.

An air flowing between the one door end portion 34Aa of the air mix door 34A and the partitioning portion 31A flows into an air inlet surface of a heater core 33 and is heated in a heat exchange portion of the heater core 33. The air flows out of an air outlet surface of the heater core 33, and then reaches an air mix chamber through the hot-air passage 30aH.

An air flowing toward the cold-air passage 30aC flows downward from the air outlet surface 320 of the evaporator 32 through between the arc-shaped outer wall and a rotary shaft of the air mix door 34A. Then, the air is changed to flow upward in the cold-air passage 30aC without passing through the heater core 33, and reaches the air mix chamber located vehicle-rearward of the heater core 33. The downward flow inside the rotary door attracts a flow in a passage between the above-described one door end portion 34Aa and a sealing portion 340, and guides the flow in a direction away from the partitioning portion 31A. This is an action of the air mix door 34A having a characteristic configuration according to the fourth embodiment.

In the air mix chamber, a hot air from the hot-air passage 30aH and a cold air from the cold-air passage 30aC mix with each other to be a conditioned air adjusted in temperature. The conditioned air is blown into a duct through a foot air outlet 380 and is blown out of an air blowing port in the vehicle compartment toward a foot area of a passenger.

By making such air flows, the inside air having a higher humidity than the outside air and flowing in the inside-air passage 30a can be prevented from entering the outside-air passage 30b through a clearance or the like formed between the air inlet surface of the heater core 33 and the partitioning portion 31A. The air mix door 34A may be used as an example of the above-described restriction portion.

As above, preferable embodiments of the present disclosure are described, but the present disclosure is not limited to the above-described embodiments. The present disclosure can be changed variously to be implemented without departing from the scope of the present disclosure. The structures of the above-described embodiments are just examples, and the scope of the present disclosure is not limited to the scope of these descriptions. The scope of the present disclosure is shown by descriptions of the scope of claims, and includes the descriptions of the scope of claims and all modifications within the meanings and scope of equivalents.

In the above-described embodiments, the air mix doors disposed in the inside-air passage 30a and the outside-air passage 30b separately are the sliding doors or the rotary door. However, the air mix doors may be film sliding doors.

Each of the defroster door 36, the face door 37 and the foot door 38 is a plate-shaped single-swing door in the above-described embodiments, but may be another type door such as a butterfly-type door having a support in the center part of a body of the door, or a sliding door that is movable parallel.

The invention claimed is:

1. A vehicular air conditioner comprising:
    an air-conditioning casing;
    a blower drawing air into the air-conditioning casing;
    a partitioning portion separating an inside of the air-conditioning casing into an inside-air passage in which an inside air drawn by the blower from inside a vehicle compartment flows, and an outside-air passage in which an outside air drawn by the blower from outside the vehicle compartment flows;
    a cooling heat exchanger extending across both the inside-air passage and the outside-air passage to cool the inside air and the outside air;
    a heating heat exchanger extending into both the inside-air passage and the outside-air passage on a downstream side of the cooling heat exchanger in an air flow direction to heat the inside air and the outside air;
    a clearance between the partitioning portion and the heating heat exchanger; and
    a restriction portion including a first temperature regulation door disposed in the inside-air passage between the cooling heat exchanger and the heating heat exchanger, the first temperature regulation door regulating a flow ratio of an air passing through the heating heat exchanger and an air bypassing the heating heat exchanger, and regulating a temperature of air supplied to the vehicle compartment, wherein
    the first temperature regulation door has a surface restricting an air flow,
    the surface of the first temperature regulation door includes a first door end portion and a second door end portion that is farther from the partitioning portion than the first door end portion,
    a distance between the first door end portion and an air outlet surface of the cooling heat exchanger, through which air passing through the cooling heat exchanger flows out, is shorter than a distance between the second door end portion and the air outlet surface,
    the first temperature regulation door is a sliding door,
    the restriction portion further includes a sealing portion that extends from the partitioning portion toward the sliding door, the sealing portion blocking an air to flow through the heating heat exchanger when overlapping with a part of the sliding door in the air flow direction,
    the sealing portion extends in a direction away from both the partitioning portion and the air outlet surface, and
    an inclination angle of the sealing portion with respect to the air outlet surface of the cooling heat exchanger is larger than an inclination angle of the heating heat exchanger with respect to the air outlet surface of the cooling heat exchanger.

2. The vehicular air conditioner according to claim 1, wherein
    the restriction portion further includes a second temperature regulation door disposed in the outside-air passage between the cooling heat exchanger and the heating heat exchanger, the second temperature regulation door separating the outside air flowing in the outside-air passage into an air passing through the heating heat exchanger and an air bypassing the heating heat exchanger, and regulating a temperature of air supplied to the vehicle compartment,
    the second temperature regulation door has a surface restricting an air flow,
    the surface of the second temperature regulation door includes a first door end portion and a second door end portion that is nearer to the partitioning portion than the first door end portion, and
    a distance between the first door end portion and the air outlet surface is shorter than a distance between the second door end portion and the air outlet surface in an entire movable range of the second temperature regulation door.

3. The vehicular air conditioner according to claim 1, wherein the heating heat exchanger includes a first end portion located in the outside-air passage, and a second end portion located in the inside-air passage, and a distance between the first end portion and the air outlet surface is shorter than a distance between the second end portion and the air outlet surface.

4. The vehicular air conditioner according to claim 1, wherein the sealing portion extends obliquely from the partitioning portion toward the first temperature regulation door.

5. The vehicular air conditioner according to claim 1, wherein the cooling heat exchanger and the heating heat exchanger are parallel to each other, normal to air flow and perpendicular to the partitioning portion.

6. The vehicular air conditioner according to claim 5, wherein the first temperature regulation door and the sealing portion are parallel to each other.

7. The vehicular air conditioner according to claim 1, wherein the cooling heat exchanger, the heating heat exchanger and a second temperature regulation door disposed in the outside-air passage between the cooling heat exchanger and the heating heat exchanger are parallel to each other, normal to air flow and perpendicular to the partitioning portion.

8. The vehicular air conditioner according to claim 1 further comprising a first tilt angle defined between the sealing portion and the air outlet surface, and a second tilt angle defined between the first temperature regulation door and the outlet surface, wherein a measurement of the first tilt angle is equal to a measurement of the second tilt angle.

9. The vehicular air conditioner according to claim 1, wherein the distance between the first door end portion and the air outlet surface of the cooling heat exchanger is shorter than the distance between the second door end portion and the air outlet surface in an entire movable range of the first temperature regulation door.

10. The vehicular air conditioner according to claim 1, wherein the sealing portion is parallel to the first temperature regulation door.

11. A vehicular air conditioner comprising:
an air-conditioning casing;
a blower drawing air into the air-conditioning casing;
a partitioning portion separating an inside of the air-conditioning casing into an inside-air passage in which an inside air drawn by the blower from inside a vehicle compartment flows, and an outside-air passage in which an outside air drawn by the blower from outside the vehicle compartment flows;
a cooling heat exchanger extending across both the inside-air passage and the outside-air passage to cool the inside air and the outside air;
a heating heat exchanger extending into both the inside-air passage and the outside-air passage on a downstream side of the cooling heat exchanger in an air flow direction to heat the inside air and the outside air;
a clearance between the partitioning portion and the heating heat exchanger; and
a restriction portion including a first temperature regulation door disposed in the inside-air passage between the cooling heat exchanger and the heating heat exchanger, the first temperature regulation door regulating a flow ratio of an air passing through the heating heat exchanger and an air bypassing the heating heat exchanger, and regulating a temperature of air supplied to the vehicle compartment, wherein the first temperature regulation door has a surface restricting an air flow, the surface of the first temperature regulation door includes a first door end portion and a second door end portion that is farther from the partitioning portion than the first door end portion, a distance between the first door end portion and an air outlet surface of the cooling heat exchanger, through which air passing through the cooling heat exchanger flows out, is shorter than a distance between the second door end portion and the air outlet surface, the first temperature regulation door is a sliding door, the restriction portion further includes a sealing portion that extends from the partitioning portion toward the sliding door, the sealing portion blocking an air to flow through the heating heat exchanger when overlapping with a part of the sliding door in the air flow direction, the sealing portion extends in a direction away from both the partitioning portion and the air outlet surface, and the cooling heat exchanger and the heating heat exchanger are parallel to each other, normal to air flow and perpendicular to the partitioning portion.

\* \* \* \* \*